United States Patent [19]

Zierhut

[11] Patent Number: 4,645,930

[45] Date of Patent: Feb. 24, 1987

[54] MOTION DETECTOR

[75] Inventor: Hermann Zierhut, Munich, Fed. Rep. of Germany

[73] Assignee: Richard Hirschmann Radiotechnisches Werk, Esslingen, Fed. Rep. of Germany

[21] Appl. No.: 685,076

[22] Filed: Dec. 24, 1984

[30] Foreign Application Priority Data

Dec. 23, 1983 [DE] Fed. Rep. of Germany ....... 3346699

[51] Int. Cl.[4] .............................................. G01J 5/08

[52] U.S. Cl. .................................... 250/342; 250/353

[58] Field of Search ..................... 250/221, 222.1, 342, 250/353; 340/567

[56] References Cited

U.S. PATENT DOCUMENTS

| | | | |
|---|---|---|---|
| 4,318,089 | 3/1982 | Frankel et al. | 250/353 X |
| 4,429,225 | 1/1984 | Fumoto et al. | 250/353 |
| 4,479,056 | 10/1984 | Zierhut | 250/342 |

*Primary Examiner*—Eugene R. LaRoche
*Assistant Examiner*—Steven J. Mottola
*Attorney, Agent, or Firm*—Karl F. Ross; Herbert Dubno

[57] ABSTRACT

A motion detector of the space surveillance type wherein an elongate box has parallel walls and an aperture opening toward sensors, and a pair of upwardly divergent reflectors is provided for at least one of the two sensing field planes, the reflectors making an angle of 20° or less with each other.

11 Claims, 6 Drawing Figures

MOTION DETECTOR

FIELD OF THE INVENTION

My present invention relates to a motion detector operating with electromagnetic radiation and, especially, to a device for detecting motion in a pair of sensing field planes (viewing planes or fields) utilizing infrared radiation.

BACKGROUND OF THE INVENTION

In my U.S. Pat. No. 4,479,056 issued Oct. 23, 1984 and based upon a German patent document - open application DE-OS No. 31 19 720, I have described a motion detector for space surveillance which comprises a concave mirror forming an optical system for focusing infrared radiation collected from the viewing fields of horizontal and vertical planes in the space under surveillance onto an infrared sensor or detector, the sensor or detector being provided at one end of a connecting element in which the rays of radiation are multiply reflected enroute to the mirror and from the mirror to the sensor.

In this construction, a window is provided in one wall of the connecting element or box, at one end of which the concave mirror is mounted and at the other end of which the radiation sensor is provided.

With this system, utilizing a spherically concave mirror, it is possible to increase the activation reliability of the alarm utilizing the motion detector because a number of viewing fields can be monitored as a result of the fact that the foci of the radiation from the various fields lie along the detector axes which are inclined to the optical axes of the optics formed by the mirror as a result in part of the reflection upon the inner surfaces of the boxlike structure.

With this technique, while a number of viewing fields in the vertical plane can be monitored with a comparatively small unit, azimuthal range is somewhat limited because at distances of say 200 m from the box, the spacing of the fields to which the device can respond becomes sufficient to allow for entry of an intrusion and the presence or movement of an intruder without interruption or detection by one of the viewing fields.

In many applications, moreover, the reliability is not satisfactory because of the comparatively small number of horizontal viewing fields.

In that arrangement, moreover, the walls of the box serving for internal reflection, generally converge toward the end of the box provided with the sensors. This has been found to be a disadvantage in some cases because of the comparatively high cost of fabrication of the device.

Naturally one can enlarge the window of the box and/or increase the length and/or number of sensors and thereby increase the number of viewing fields in both planes. This does not increase reliability necessarily and represents a comparatively expensive and even impractical solution to the problem since it almost invariably is associated with an increase in size of the motion detector and hence the ability of an intruder to discover it and, by blocking the detector, avoid the monitoring action.

OBJECTS OF THE INVENTION

Accordingly, it is the principal object of the present invention to provide an improved motion detector utilizing the principles described in the aforementioned patent and patent document whereby the disadvantages of earlier devices are avoided.

Another object of this invention is to provide a relatively simple and inexpensive motion sensor having an increased number of viewing fields without increase in dimensions and which can have the same number of sensors as earlier devices with fewer sensing fields It is an object of the invention to provide a compact motion detector which can have an increased number of sensing fields in both the vertical and the horizontal sensing field planes and which is of inexpensive manufacture.

SUMMARY OF THE INVENTION

These objects and others which will become apparent hereinafter are attained, in accordance with the present invention in a motion detector responsive to incident radiation and especially incident infrared radiation which comprises a box having opposite ends and two pairs of mutually parallel walls extending between these ends, at least two of these walls having internal surfaces which are reflective to this radiation and one of the latter walls of which is provided close to one end of the box with a window admitting such radiation to the interior of the box.

Radiation sensing means at one end of the box has an optical axis generally parallel to these internal surfaces for outputting a signal representing motion in horizontal and vertical sensing field planes from which the incident radiation enters the box through the window and impinges upon the reflective surfaces.

At the opposite end of the box focusing optics are provided including or constituted by a concave mirror receiving multiply reflected radiation from these surfaces and focusing it on the radiation sensing means after multiple reflection upon the surfaces. According to the invention, moreover, in combination with these parallel reflective walls, the device comprises at least two reflectors for radiation from a respective one of the field planes flanking an aperture through which the radiation is focused upon the radiation sensing means, these reflectors diverge away from the radiation sensing means toward the optics and including angles of up to 20° with this vertical axis.

By the relatively simple arrangement of these reflectors, without significant cost, I am able to use a box or connecting element between the mirror and the sensor or sensors, which has mutually parallel inner surfaces and which is able to provide a higher degree of tripping reliability because of the greater number of sensing fields, especially in the horizontal plane, but also in the vertical plane, for a motion detector of the same size and same number of sensors as used heretofore.

Conversely, if one wishes to operate with a reduced number of viewing planes as characterizes the prior art systems, the viewing fields can be more closely spaced in both the vertical and horizontal planes, so that the range can be greater than has been the case heretofore, for example for monitoring high priority storage zones which are comparatively long.

I may provide in some cases a respective mirror for each viewing plane, thereby generating an asymmetrical field of view with a limited number of sensing fields. More frequently and in the best mode embodiment of the invention, however, a symmetrical field of view is desirble in each plane. In this case, the reflectors can be provided in pairs of opposing reflectors which are respectively disposed symmetrically to the optical axis. In the other arrangement, e.g. when only multiplication in the vertical plane is desired, the reflectors which would otherwise be assigned to the horizontal plane can be eliminated.

It has been found to be especially effective to provide the reflectors as planar members although the invention also contemplates providing the reflectors as cylindrical mirrors, especially aspherical cylindrical mirrors which, although more expensive, allows the possibility of modifying the fields of view orientation by a corresponding choice of the radius of curvature.

A further multiplication of the reproduction of the monitored field can be effected by providing the reflective inner surfaces on the parallel walls of the box structure in the manner described. This allows the ray path to be lengthened considerably within the box and permits high resolution of disturbances in incident radiation from relatively wide ranges and comparatively closely adjoining fields in the respective planes.

For devices with a range of 20 to 150 m, I prefer to use two infrared sensors connected in push-pull for the radiation sensing means and thereby allow optimum exploitation of the aperture with commercially available detectors in providing the motion sensor having a wide viewing range. In this arrangement, the aperture can be rectangular and I have found that for a sensor spacing of about 2 to about 3 mm, the edges should have lengths of about 4 to 6 mm for the edges relevant to the vertical sensing field plane with the corresponding reflectors being inclined at angles of $\pm 20°$ and $\pm 15°$ to the optical axis for the reflectors assigned to the horizontal and vertical sensing field planes respectively.

In this case, in each plane there is at least a tripling of the number of viewing fields and thus of five-fold tripping reliability because of the five alarm triggering states at the five transitions from positive to negative or negative to positive voltage states. In at least the vertical plane this corresponds to a substantially increased viewing field.

According to another feature of the invention, an incident mirror is provided in the box adjacent the window and has a cutout through which radiation is focused on the radiation sensing means. This incident mirror is inclined to the optical axis and the radiation sensing means is located in a plane through the longitudinal median axis of the box for radiation from the horizontal sensing field plane, but is located in a plane of radiation from the vertical sensing field plane but offset from the longitudinal axis toward the other wall, i.e. the wall not provided with the window, having one of the reflective surfaces. This configuration allows the motion detector to be comparatively flat and compact since radiation which is not trained upon the wall opposite that provided by the window is intercepted by the incident mirror and thereby reflected onto this wall.

The window can thus be formed in a low-lying portion of the device and the device itself can be provided so that its window projects beneath decorative elements such as a curtain, drapery or the like. Indeed, in this construction it has been found to be advantageous to provide the reflectors so that those assigned to the vertical viewing field are so far back in the box or housing as possible and thus so that the rearmost one of the reflectors has its upper edge lying against the rear wall of the box, i.e. the wall opposite the window.

I have also found that it is important to provide the spacing of the optical axis of the radiation sensor, that of the optics (concave mirror), and that of the front wall provided with the window from the rear wall in the ratio of 2:3:7 to thereby provide at a range of 50 to 200 mm an extremely close relationship of the radiation fields in the vertical plane so that an undetected intrusion between these fields is practically impossible.

According to yet another feature of the invention the concave mirror has a different radius of curvature for radiation arising from the horizontal sensing field plane from its radius or curvature for radiation arising from the vertical sensing field plane. In this case, it is possible to provide still further closeness of the viewing fields in one or the other of the planes even to the point of insuring an overlap without interference upon the reflective surface of the walls of the box or the reflectors, and a similar result can be obtained by providing the incident mirror with curvature in the horizontal sensing field plane or a plane perpendicular thereto.

BRIEF DESCRIPTION OF THE DRAWING

The above and other objects, features and advantages of the present invention will become more readily apparent from the following description, reference being made to the accompanying drawing in which.

SPECIFIC DESCRIPTION

The motion sensor of the present invention is utilized in the manner described in the aforementioned U.S. patent and comprises a metallic connecting element or box 1 which is of rectangular cross section and has two mutually facing reflective inner surfaces on the front wall 8 and the rear wall 9 of this box.

Figure 4:
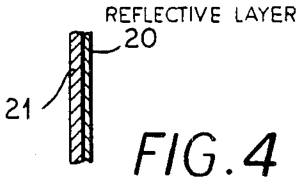
FIG. 4 is a diagrammatic section through one of the walls having a reflective inner surface.

As can be seen from FIG. 4, the reflective layer 20 may be provided on the sheet metal wall member 21 of the wall. The mirrors and reflective elements otherwise described may be similarly laminated from reflective foils and their respective supports can be metal members with highly reflective surface layers deposited thereon.

At one end, e.g. the upper end, of the box, a closure 2 is provided on which is mounted the focusing optics, here shown to be constituted of a hollow mirror 3 which is concave downwardly and has optical axis A lying in the longitudinal plane through this box.

At the lower end of the box, above a space 6 closed by a transverse wall 5 provided with an aperture 22, are a pair of infrared sensors 4 connected in a sensing circuit 23 in push-pull relationship. Any infrared detecting circuit triggering an alarm can be used for this purpose.

Figure 1:
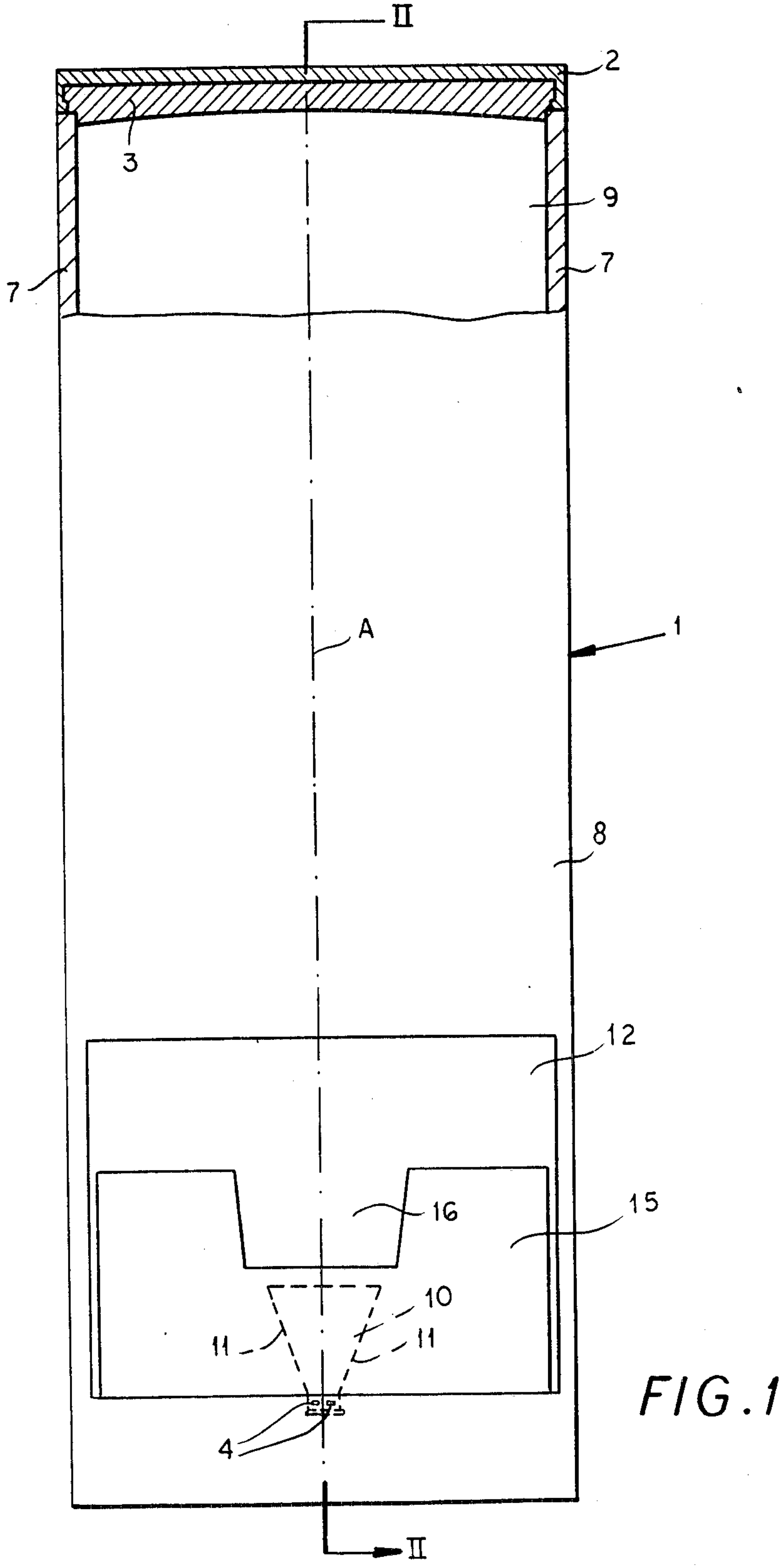
FIG. 1 is a vertical elevational view from the front of a passive infrared motion detector according to the invention, partly broken away.
Figure 5:
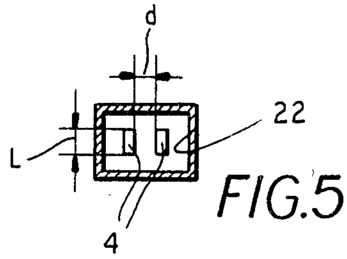
FIG. 5 is a plan view of the sensors within an aperture according to the invention.

The sensors 4 as is also apparent from FIG. 5 have a spacing d of about 3 mm and respective lengths L of about 3 mm. The aperture 22 may be rectangular as is also apparent from FIG. 5. The length of the aperture may be 7 mm while its width is 6 mm.

The aperture lies in the plane of the wall 5 and thus perpendicular to mutually parallel front and rear walls 8 and 9 and a pair of lateral walls which are likewise mutually parallel but are perpendicular to the front and rear walls, the lateral walls being represented at 7.

According to the invention, moreover, not only are the reflective inner surfaces of the front and rear walls 8 and 9 parallel to the optical axis B of the sensors 4 and to the optical axis A of the optics or mirror 3, but divergent planar reflectors 10 and 11 provided in oposite pairs diverge upwardly from the aperture 22 to form a funnel-like structure which is closed. The reflectors 10 include angles of 15° while the reflectors 11 include angles of 20° with the optical axis B of the radiation sensors 4.

The funnel structure and hence these reflectors are disposed symmetrically with respect to the optical axis B and with reference to the lateral wall 7, centrally between them. The funnel-like structure is offset, however, toward the rear wall 9 such that the upper free edge of the rearmost reflector 9 lies in contact with the inner surface while the other of these walls can intercept the far edge of the bundle reflected from the mirror 3 as shown in FIG. 2 and thus lies at the margin of the shadow of the ray which is cast upon this sensor.

The spacing of the optical axis B from the rear wall 9, the spacing of the optical axis A of the mirror 3 from the rear wall 9 and the spacing of the front wall from this rear wall are in a ratio of 2:3:7.

Figure 2:
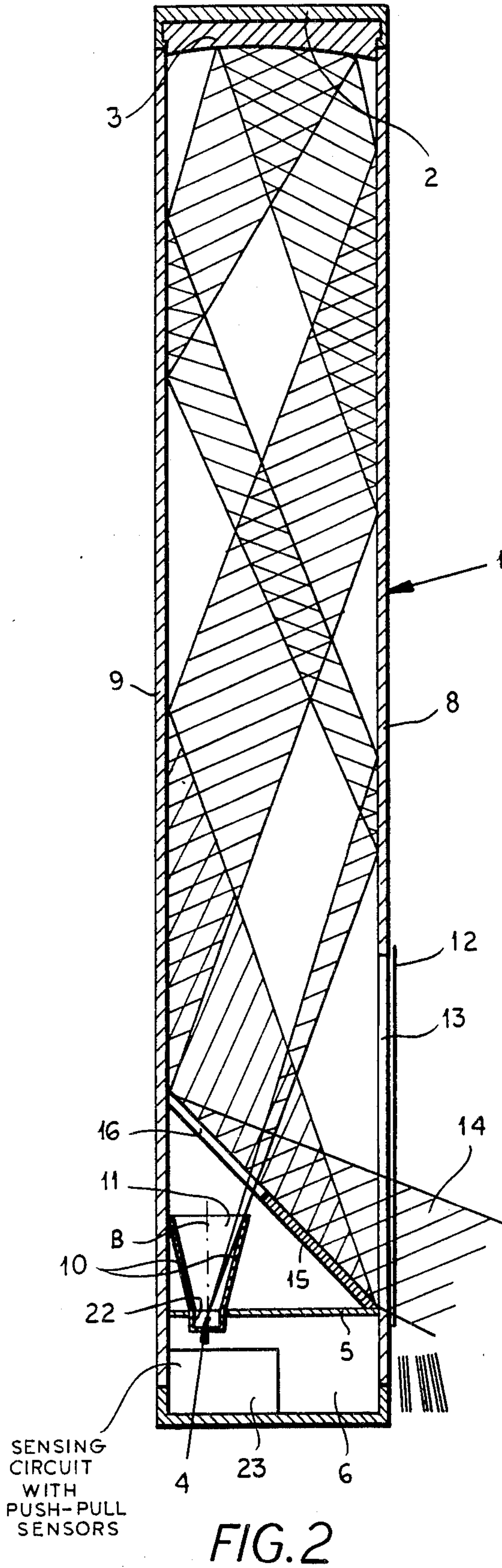
FIG. 2 is a section taken along the line II—II of FIG. 1, showing the radiation reflection patterns in highly diagrammatic form and indicating the various viewing fields by an array of lines.

The front wall 8 is provided with a window 13 which is covered by a foil 12 transparent to infrared radiation and represented by a single line in FIG. 2. This window is traversed by a parallel-ray bundle 14 of infrared radiation from the respective viewing field and this radiation impinges directly upon the reflective surface of the rear wall 9 or is intercepted by an incident mirror 15 having a cutout 16 and oriented at an angle of 45° to the vertical and the horizontal, wherefrom it is reflected upon the rear wall 9 or upon the front wall 8. As can be seen from the shaded pattern, the light bundle is reflected multiply onto the mirror 3 which focuses the infrared rays, after multiple return reflections, onto the reflector 10 and then the sensors 4 sharply.

The four reflectors 10, 11 in an extremely simple and effective manner, effect a tripling of the viewing field and, because of the multiple reflections along the front and rear walls, the multiplication can be nine-fold.

In the embodiment shown, the multiplication in the vertical plane because of the mirrored surfaces of the front and rear walls generate such a multiplication of the viewing fields that the spacings of the fields from one another even at distances of 100 m or more, are so small that an unobserved intrusion between the fields is practically impossible.

The inner surfaces of the lateral walls 7 need not be mirrored or reflective so that in the horizontal plane there is a tripling of the fields 14 for each sensor by virtue of the reflectors 11 and this of course provides five transition zones which generally will suffice to protect the monitored space. If additional field multiplication is desired in the horizontal plane, the inner surfaces of the wall 7 can likewise be rendered reflective so that here as well the multiple reflections will contribute to the increase in the number of fields.

As a consequence, the apparatus illustrated and described provides, utilizing planar reflectors 10 and 11, an extraordinary compact and flat infrared motion detector with a range of 20 to 200 m.

Figure 3:
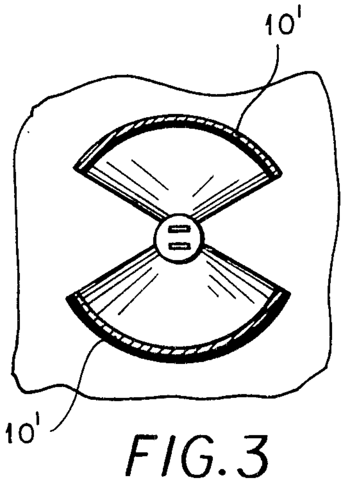
FIG. 3 is a section through a pair of reflectors according to another embodiment of the invention.
Figure 6:
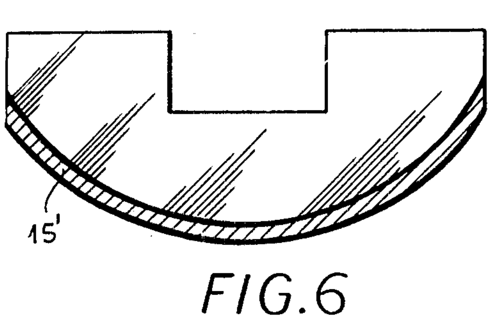
FIG. 6 is a section through an incident mirror according to another embodiment of the invention.

According to another feature of the invention, as noted previously, the incident or inclined reflector 15 can be curved as shown for the reflector 15' in section in FIG. 6, this curvature being in the vertical or horizontal plane or both. The reflectors 10 and 11 may also be curved as illustrated diagrammatically at 10' in FIG. 3.

I claim:

1. A motion detector responsive to incident radiation, comprising:

a box having a pair of opposite ends, and two pairs of opposing walls extending between said ends, an inlet opening for said incident radiation being provided generally at one of said ends, at least one of said pairs of walls being provided internally with reflecting surfaces;

focusing optics including a concave mirror mounted in said box at the other of said ends and being concave in the direction of said one of said ends;

radiation sensing means ahead of said one of said ends of said box having an optical axis generally directed toward said other end of said box for outputting a signal representing motion in horizontal and vertical sensing field planes from which said incident radiation enters said box through said opening and is reflected toward and focussed upon said radiation sensing means by said optics and said reflecting surfaces; and at least two relectors independent of said walls for radiation each from an respective one of said field planes flanking an aperture through which said radiation is focussed upon said radiation sensing means, said reflectors diverging away from said optical axis of said radiation sensing means toward said optics and including angles of up to 20° with said axis.

2. The radiation detector defined in claim 1 wherein the walls of both of said pairs are provided with internal reflective surfaces relecting radiation entering through said opening prior to directing said radiation upon and receiving said radiation from said mirror.

3. The radiation detector defined in claim 2 wherein said reflectors are provided in pairs, each of said pars of reflectors being assigned to a respective one of said sensing field planes.

4. The radiation detector defined in claim 3 wherein the reflectors of each pair of reflectors are disposed symmetrically with respect to said optical axis.

5. The radiation detector defined in claim 4 wherein said reflectors are planar.

6. The radiation detector defined in claim 4 wherein said relectors are cylindrical mirrors.

7. The radiation detector defined in claim 4 wherein said radiation sensing means includes a pair of push-pull connected infrared sensors and said aperture is rectangular. the edges of said aperture for a sensor spacing and length of about 2 to 3 mm having dimensions from about 5 to 7 mm for the edges relevant to the horizontal sensing field plane and from about 4 to about 6 mm for the edges relevant to the vertical sensing field plane, with the corresponding reflectors being inclined at angles of ±20° and ±15° to the optical axis for the reflectors assigned to the horizontal and vertical sensing field planes respectively.

8. The radiation detector defined in claim 4 wherein said opening is a window in one of said walls, further comprising an incident mirror in said box adjacent said window and having a cutout through which radiation is focused on said radiation sensing means, said incident mirror being inclined to said axis and said radiation sensing means being located in a plane through the longitudinal median axis of said box for radiation from said horizontal sensing field plane but being located in a plane of radiation from said vertical sensing field plane offset from said longitudinal axis toward the other wall of the pair whose wall is formed with said window and provided with said reflective surfaces.

9. The radiation detector defined in claim 4 wherein the spacing of said optical axis from said other of said walls, the spacing of an optical axis of said optics from said other of said walls and the spacing of said one of said walls from said other of said walls is in the ratio of 2:3:7.

10. A motion detector responsive to incident radiation, comprising:

a box having a pair of opposite ends, and two pairs of opposing walls extending between said ends, an inlet opening for said incident radiation being provided generally at one of said ends, at least one of said pairs of walls being provided internally with reflecting surfaces;

radiation sensing means ahead of said one of said ends of said box having an optical axis generally directed toward said other end of said box for outputting a signal representing motion in horizontal and vertical sensing field planes from which said incident radiation enters said box through said opening and is reflected by said reflecting surfaces; and focusing optics including a concave mirror mounted in said box at the other of said ends and being concave in the direction of said one of said ends for focussing radiation reflected onto said mirror by said reflecting surfaces upon said radiation sensing means, said concave mirror having a different radius of curvature for radiation arising from said horizontal sensing field plane from its radius of curvature for radiation arising from said vertical sensing field plane.

11. A motion detector responsive to incident radiation comprising:

a box having a pair of opposite ends and two pairs of mutually parallel opposite walls extending between said ends and formed internally with reflective surfaces, one wall of one of said pairs being provided close to one end of said box with a window admitting said radiation;

radiation sensing means at said one end of said box having an optical axis generally parallel to the walls of said one pair for outputting a signal representing motion in horizontal and vertical sensing field planes from which said incident radiation enters said box through said window and impinges upon said reflective surfaces;

focusing optics at the opposite end of said box and including a concave mirror receiving radiation entering from said window and focusing it on said radiation sensing means; and at least two reflectors independently of said walls from a respective one of said sensing field planes flanking an aperture through which said radiation is focused upon said radiation sensing means, diverging away from said radiation sensing means toward said optics and including angles up to 20° with said axis.

* * * * *